US011043003B2

(12) United States Patent  
Ayvaci et al.

(10) Patent No.: US 11,043,003 B2  
(45) Date of Patent: Jun. 22, 2021

(54) INTERACTED OBJECT DETECTION NEURAL NETWORK

(71) Applicant: Waymo LLC, Mountain View, CA (US)

(72) Inventors: Alper Ayvaci, Santa Clara, CA (US); Yu-Han Chen, Sunnyvale, CA (US); Ruichi Yu, Mountain View, CA (US); Chen Wu, Cupertino, CA (US); Noha Waheed Ahmed Radwan, Berlin (DE); Jonathon Shlens, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 31 days.

(21) Appl. No.: 16/686,840

(22) Filed: Nov. 18, 2019

(65) Prior Publication Data

US 2021/0150752 A1 May 20, 2021

(51) Int. Cl.  
*G06T 7/73* (2017.01)  
*G06T 7/50* (2017.01)  
(Continued)

(52) U.S. Cl.  
CPC ............... *G06T 7/73* (2017.01); *G06K 9/628* (2013.01); *G06K 9/6217* (2013.01); *G06N 3/04* (2013.01);  
(Continued)

(58) Field of Classification Search  
CPC ..... G06T 7/73; G06T 7/50; G06T 7/11; G06T 7/20; G06T 7/246; G06T 2207/20084;  
(Continued)

(56) References Cited

U.S. PATENT DOCUMENTS

| 10,423,860 B1* | 9/2019 | Kim ..................... G06N 3/0454 |
| 2014/0168431 A1* | 6/2014 | Goto ................. G06K 9/00342 348/143 |

(Continued)

OTHER PUBLICATIONS

"Observing Human-Object Interactions: Using Spatial and Functional Compatibility for Recognition"; A. Gupta, IEEE Transactions on Pattern Analysis and Machine Intelligence (vol. 31, Issue: 10, pp. 1775-1789) (Year: 2009).*

(Continued)

*Primary Examiner* — Michael S Osinski  
(74) *Attorney, Agent, or Firm* — Fish & Richardson P.C.

(57) ABSTRACT

Methods, systems, and apparatus, including computer programs encoded on a computer storage medium, for generating object interaction predictions using a neural network. One of the methods includes obtaining a sensor input derived from data generated by one or more sensors that characterizes a scene. The sensor input is provided to an object interaction neural network. The object interaction neural network is configured to process the sensor input to generate a plurality of object interaction outputs. Each respective object interaction output includes main object information and interacting object information. The respective object interaction outputs corresponding to the plurality of regions in the sensor input are received as output of the object interaction neural network.

20 Claims, 5 Drawing Sheets

(51) Int. Cl.
*G06K 9/62* (2006.01)
*G06N 3/08* (2006.01)
*G06N 3/04* (2006.01)

(52) U.S. Cl.
CPC ............... *G06N 3/08* (2013.01); *G06T 7/50* (2017.01); *G06T 2207/10028* (2013.01); *G06T 2207/20084* (2013.01); *G06T 2207/30196* (2013.01)

(58) Field of Classification Search
CPC . G06T 2207/20081; G06T 2207/10016; G06T 2207/30196; G06T 2207/10028; G06T 2207/30232; G06T 2207/20104; G06T 2210/12; G06K 9/628; G06K 9/6217; G06K 9/6256; G06K 9/00369; G06K 9/3233; G06K 9/00362; G06K 9/00335; G06N 3/04–088
See application file for complete search history.

(56) References Cited

U.S. PATENT DOCUMENTS

| | | | | |
|---|---|---|---|---|
| 2014/0270482 | A1* | 9/2014 | Chakraborty | G06K 9/00677 382/154 |
| 2018/0005042 | A1* | 1/2018 | Loce | G08B 13/19613 |
| 2018/0181822 | A1* | 6/2018 | Chang | G06K 9/628 |
| 2019/0005358 | A1* | 1/2019 | Pisoni | G06N 3/08 |
| 2019/0050994 | A1* | 2/2019 | Fukagai | G06K 9/3233 |
| 2019/0213406 | A1* | 7/2019 | Porikli | G06K 9/00389 |
| 2019/0286892 | A1* | 9/2019 | Li | G06K 9/00362 |
| 2019/0286921 | A1* | 9/2019 | Liang | G06T 7/70 |
| 2019/0294881 | A1* | 9/2019 | Polak | G06K 9/4628 |
| 2019/0325208 | A1* | 10/2019 | Wang | G06K 9/00979 |
| 2020/0160048 | A1* | 5/2020 | Wang | G06T 7/70 |
| 2020/0175326 | A1* | 6/2020 | Shen | G05D 1/0088 |
| 2020/0250499 | A1* | 8/2020 | Kim | G06N 3/084 |
| 2020/0293064 | A1* | 9/2020 | Wu | G06K 9/6256 |
| 2020/0307563 | A1* | 10/2020 | Ghafarianzadeh | B60W 60/00274 |
| 2020/0311943 | A1* | 10/2020 | Dai | G06N 3/04 |
| 2020/0327681 | A1* | 10/2020 | Li | G06K 9/6256 |
| 2020/0331465 | A1* | 10/2020 | Herman | G05D 1/0276 |
| 2020/0341114 | A1* | 10/2020 | Acharya | G01S 13/26 |
| 2020/0349362 | A1* | 11/2020 | Maloney | G06T 7/73 |
| 2020/0364882 | A1* | 11/2020 | Feng | G06T 7/207 |
| 2020/0364894 | A1* | 11/2020 | Akhil | G06T 7/70 |
| 2020/0380252 | A1* | 12/2020 | Ding | G08B 5/22 |
| 2020/0382965 | A1* | 12/2020 | Jotshi | H04W 24/02 |
| 2020/0402240 | A1* | 12/2020 | Golov | G06K 9/00791 |
| 2020/0410224 | A1* | 12/2020 | Goel | G06K 9/00362 |
| 2020/0410281 | A1* | 12/2020 | Goel | G06K 9/6221 |
| 2021/0012127 | A1* | 1/2021 | Chen | G06K 9/6267 |
| 2021/0019627 | A1* | 1/2021 | Zhang | G06K 9/00718 |
| 2021/0027098 | A1* | 1/2021 | Ge | G06K 9/6256 |
| 2021/0027103 | A1* | 1/2021 | Brower | G06N 3/04 |
| 2021/0034906 | A1* | 2/2021 | Van Welzen | G06K 9/3266 |

OTHER PUBLICATIONS

Bansal et al., "Detecting Human-Object Interactions via Functional Generalization," arXiv:1904.03181v1, Apr. 2019, 12 pages.
Chao et al., "Learning to Detect Human-Object Interactions," arXiv:1702.05448v2, Mar. 2018, 10 pages.
Gkioxari et al., "Detecting and Recognizing Human-Object Interactions," Jun. 2018, retrieved from URL <http://openaccess.thecvf.com/content_cvpr_2018/papers/Gkioxari_Detecting_and_Recognizing_CVPR_2018_paper.pdf>, 8359-8367.
Gupta et al., "No-Frills Human-Object Interaction Detection: Factorization, Appearance and Layout Encodings, and Training Techniques," arXiv:1811.05967v1, Nov. 2018, 11 pages.
He et al., "Deep Residual Learning for Image Recognition," 2016 IEEE Conference on Computer Vision and Pattern Recognition (CVPR), Jun. 2016, 9 pages.
Lin et al., "Feature Pyramid Networks for Object Detection," 2017 IEEE Conference on Computer Vision and Pattern Recognition (CVPR), Jul. 2017, 9 pages.
Lin et al., "Focal Loss for Dense Object Detection," 2017 IEEE International Conference on Computer Vision (ICCV), Oct. 2017, 9 pages.
Ren et al, "Faster R-CNN: Towards Real-Time Object Detection with Region Proposal Networks," https://arxiv.org/abs/1506.01497v2, Sep. 2015, 10 pages.
Xu et al., "Interact as You Intend: Intention-Driven Human-Object Interaction Detection," arXiv:1808.09796v1, Aug. 2018, 9 pages.

* cited by examiner

INTERACTED OBJECT DETECTION NEURAL NETWORK

BACKGROUND

This specification relates to autonomous vehicles.

Autonomous vehicles include self-driving cars, boats, and aircraft. Autonomous vehicles use a variety of on-board sensors and computer systems to detect nearby objects and use such detections to make control and navigation decisions.

Some autonomous vehicles have computer systems that implement neural networks for object classification within images. For example, a neural network can be used to determine that an image captured by an on-board camera is likely to be an image of a nearby car.

Neural networks, or for brevity, networks, are machine learning models that employ multiple layers of operations to predict one or more outputs from one or more inputs. Neural networks typically include one or more hidden layers situated between an input layer and an output layer. The output of each layer is used as input to another layer in the network, e.g., the next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

An architecture of a neural network specifies what layers are included in the network and their properties, as well as how the neurons of each layer of the network are connected. In other words, the architecture specifies which layers provide their output as input to which other layers and how the output is provided.

The transformation operations of each layer are performed by computers having installed software modules that implement the transformation operations. Thus, a layer being described as performing operations means that the computers implementing the transformation operations of the layer perform the operations.

Each layer generates one or more outputs using the current values of a set of parameters for the layer. Training the network thus involves continually performing a forward pass on the input, computing gradient values, and updating the current values for the set of parameters for each layer. Once a neural network is trained, the final set of parameters can be used to make predictions in a production system.

Convolutional neural networks include convolutional neural network layers. Convolutional neural network layers have a neuron connectivity that takes advantage of spatially local correlation in the input data. To do so, convolutional neural network layers have sparse connectivity, with neurons in one convolutional layer receiving input from only a small subset of neurons in the previous neural network layer. The other neurons from which a neuron receives its input defines a receptive field for that neuron.

Convolutional neural network layers have one or more parameters that define one or more filters for each layer, with each filter having one or more parameters. A convolutional neural network layer generates an output by performing a convolution of each neuron's filter with the layer's input.

In addition, each convolutional network layer can have neurons in a three-dimensional arrangement, with depth, width, and height dimensions. The width and height dimensions correspond to the two-dimensional features of the layer's input. The depth-dimension includes one or more depth sublayers of neurons. Convolutional neural networks employ weight sharing so that all neurons in a depth sublayer have the same weights. This provides for translation invariance when detecting features in the input.

Convolutional neural networks can also include fully-connected layers and other kinds of layers. Neurons in fully-connected layers receive input from each neuron in the previous neural network layer.

Autonomous and semi-autonomous vehicle systems can use full-vehicle predictions for making driving decisions. A full-vehicle prediction is a prediction about a region of space that is occupied by a vehicle. The predicted region of space can include space that is unobservable to a set of on-board sensors used to make the prediction.

Autonomous vehicle systems can make full-vehicle predictions using human-programmed logic. The human-programmed logic specifies precisely how the outputs of on-board sensors should be combined, transformed, and weighted, in order to compute a full-vehicle prediction.

SUMMARY

This specification describes how a computer system can implement a fully-learned neural network to make object interaction prediction from input sensor data. In other words, the system can make accurate object interaction predictions from input sensor data without using human-programmed logic about how the input sensor data should be combined or analyzed.

In general, one innovative aspect of the subject matter described in this specification can be embodied in methods that include the actions of obtaining a sensor input derived from data generated by one or more sensors that characterizes a scene; providing the sensor input as input to an object interaction neural network, wherein the object interaction neural network is configured to process the sensor input to generate a plurality of object interaction outputs, each respective object interaction output comprising: main object information that identifies a main object location of a main object in the sensor input; and interacting object information that identifies (i) an interaction confidence score that represents a likelihood that there is another object interacting with the main object and (ii) data defining the location of the interacting object in the sensor input, if such an object exists; and receiving, as output of the object interaction neural network, the respective object interaction outputs corresponding to the plurality of regions in the sensor input. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The sensor input comprises an image of the scene. The input to the object interaction neural network further comprises a depth input that characterizes a depth of the scene at different locations in the sensor input. The sensor input comprises point cloud data characterizing the scene. The main object information further comprises an object detection confidence score that represents a likelihood that the main object is depicted at the main object location. The main object information further comprises an object type output that includes a respective probability for each of a plurality of object classes that represents a likelihood that the main object belongs to the object class. The actions include identifying a first object interaction output that includes an interaction confidence score that exceeds a threshold value; obtaining features of a region in the sensor data that includes the interacting object location of the interacting object in the first object interaction output; providing the features as input to a refinement neural network that is configured to process the features to generate a refined location of the interacting object in the sensor input; and obtaining, as output from the refinement neural network, the refined location of the interacting object. The actions include obtaining a location output of an object detector that detects objects of a particular type in the sensor input; determining whether any of the interacting object locations in the object interaction outputs match locations of objects of the particular type as defined by the location output; and when the interacting object location of an interacting object matches a location of an object of the particular type, determining that the interacting object is the same object as the object of the particular type. The object interaction neural network has been trained to identify only objects of a particular object type as the interacting objects. The particular object type is people. The object interaction neural network has been trained to identify people as the main objects in the object interaction outputs.

Particular embodiments of the subject matter described in this specification can be implemented so as to realize one or more of the following advantages. An autonomous or semi-autonomous vehicle system can use a fully-trained neural network subsystem to make object interaction predictions, i.e., to determine when two objects captured by the sensors of the vehicle are interacting with one another. The neural network can use raw sensor data as input, which can reduce the risk of failures that occur in traditional, heuristic-based approaches. The system can determine that two objects are interacting and can cause the planning system to properly identify an object that would otherwise be static as dynamic. More generally, the system can exploit the object interaction information at many stages of an autonomous or semi-autonomous vehicle pipeline, e.g., segmentation, tracking, action recognition and behavior prediction. In other words, by being able to accurately identify which objects are interacting, the vehicle can make better autonomous driving decisions or can provide better semi-autonomous driving recommendations for the operator of the vehicle. In particular, because two objects that are interacting behave differently than two objects that are not interacting, this additional information can improve the performance of the system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a vehicle, e.g., an autonomous or semi-autonomous vehicle, can use a fully-learned neural network to make object interaction predictions from input sensor data. Each object interaction prediction specifies a region of space that is likely to be occupied by a pair of objects that interact with each other. The neural network can be trained to detect any appropriate object interactions, including pedestrians pushing strollers, bicyclists riding bicycles, pedestrians walking with their dogs, to name just a few examples.

As used in this description, a "fully-learned" machine learning model is a model that is trained to compute a desired prediction. In other words, a fully-learned model generates an output based solely on training data rather than on human-programmed decision logic.

Figure 1:
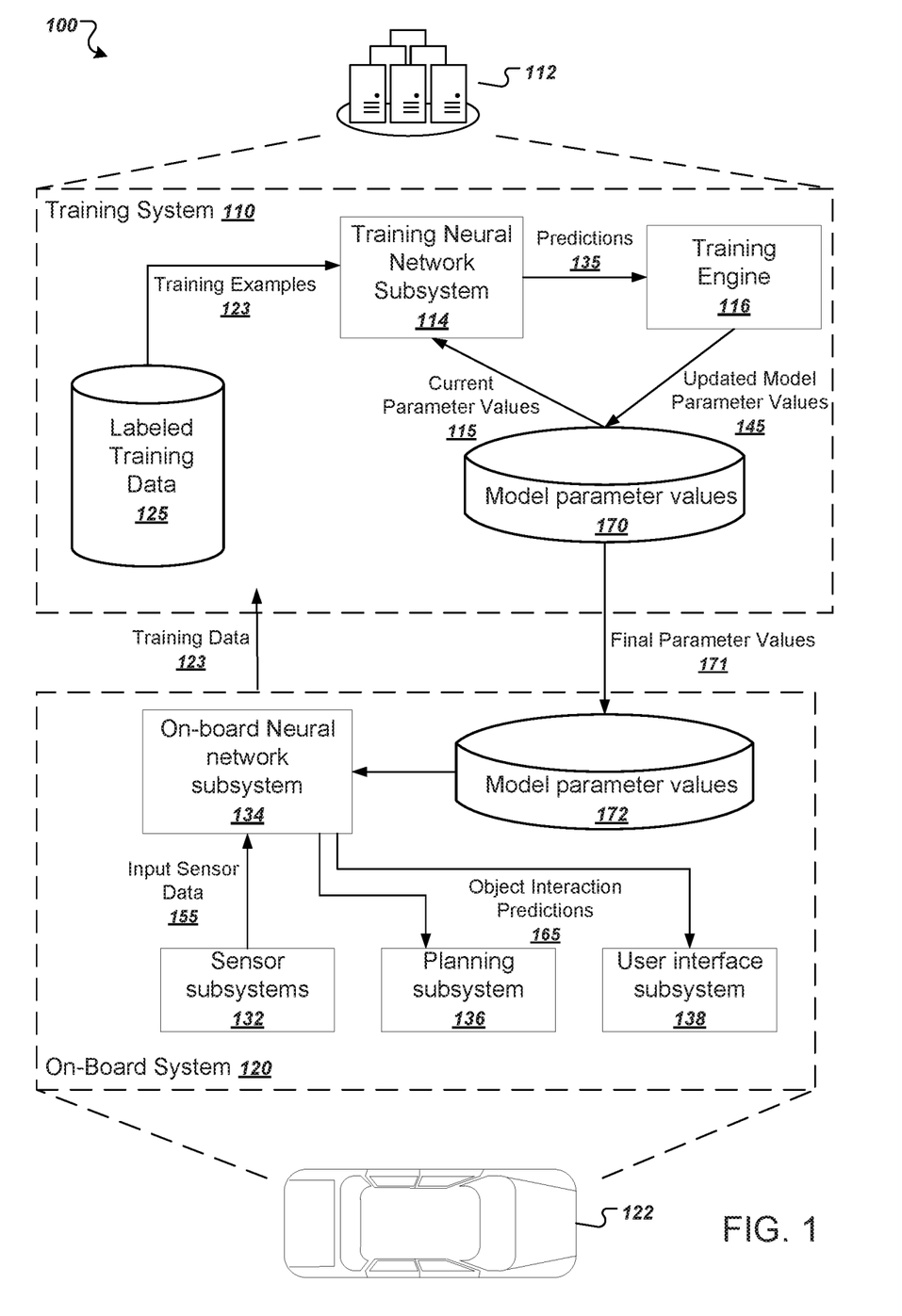
FIG. 1 is a diagram of an example system.

FIG. 1 is a diagram of an example system 100. The system 100 includes a training system 110 and an on-board system 120.

The on-board system 120 is physically located on-board a vehicle 122. Being on-board the vehicle 122 means that the on-board system 120 includes components that travel along with the vehicle 122, e.g., power supplies, computing hardware, and sensors. The vehicle 122 in FIG. 1 is illustrated as an automobile, but the on-board system 120 can be located on-board any appropriate vehicle type. The vehicle 122 can be a fully autonomous vehicle that uses object predictions to inform fully-autonomous driving decisions. The vehicle 122 can also be a semi-autonomous vehicle that uses object predictions to aid a human driver. For example, the vehicle 122 can autonomously apply the brakes if an object prediction indicates that a human driver is about to collide with another vehicle.

The on-board system 120 includes one or more sensor subsystems 132. The sensor subsystems include a combination of components that receive reflections of electromagnetic radiation, e.g., lidar systems that detect reflections of laser light, radar systems that detect reflections of radio waves, and camera systems that detect reflections of visible light.

The sensor subsystems 132 provide input sensor data 155 to an on-board neural network subsystem 134. The input sensor data 155 can include multiple channels of data, where each channel represents a different characteristic of reflected electromagnetic radiation. Thus, the input sensor data 155 derived from data generated by one or more sensors characterizes a scene in the vicinity of the autonomous vehicle. For example, the input sensor data 155 can be or can include an image of the scene captured from the camera systems. As another example, the input sensor data 155 can include depth information of the input image that characterizes a depth of the scene at different locations. As another example, the input sensor data 155 includes point cloud data characterizing the scene.

Generally, the input sensor data 155 could be one or multiple channels of data from one sensor, e.g., just an image, or multiple channels of data from multiple sensors, e.g., an image generated from the camera system and laser data generated from the laser readings.

The sensor-subsystems 132, or the on-board neural network subsystem 134, or some combination of both, transform raw sensor data into the multiple channels of input sensor data 155. To do so, the on-board system 120 can project the various characteristics of the raw sensor data into a common coordinate system.

The on-board neural network subsystem 134 implements the operations of each layer of an object interaction neural network trained to make object interaction predictions. Thus, the on-board neural network subsystem 134 includes one or more computing devices having software or hardware modules that implement the respective operations of each layer of the neural network according to an architecture of the neural network.

The on-board neural network subsystem 134 can implement the operations of each layer of the neural network by loading a collection of model parameter values 172 that are received from the training system 110. Although illustrated as being logically separated, the model parameter values 170 and the software or hardware modules performing the operations may actually be located on the same computing device or, in the case of an executing software module, stored within the same memory device.

The on-board neural network subsystem 134 can use hardware acceleration or other special-purpose computing devices to implement the operations of one or more layers of the neural network. For example, some operations of some layers may be performed by highly parallelized hardware, e.g., by a graphics processing unit or another kind of specialized computing device. In other words, not all operations of each layer need to be performed by central processing units (CPUs) of the on-board neural network subsystem 134.

The on-board neural network subsystem 134 uses the input sensor data 155 to generate one or more object interaction predictions 165. The on-board neural network subsystem 134 can provide the one or more object interaction predictions 165 to a planning subsystem 136, a user interface subsystem 138, or both.

Each object interaction prediction includes main object information and interacting object information. The main object information identifies a main object location of a main object in the input sensor data 155 characterizing the environment surrounding the vehicle 122. The interacting object information identifies (i) an interaction confidence score that represents a likelihood that there is another object interacting with the main object in the input sensor data 155 and (ii) data defining the location of the interacting object in the input sensor data 155, if such an object exists.

In some implementations, the object interaction neural network has been trained to identify only objects of a particular object type as the main objects, e.g., only identify pedestrians as main objects, and to identify objects of any type as interacting objects. In some other implementations, the object interaction neural network has been trained to identify only objects of a particular object type as the interacting objects, e.g., to only identify pedestrians as interacting objects, and to identify objects of any type as the main objects.

When a planning subsystem 136 receives the one or more object interaction predictions 165, the planning subsystem 136 can use the one or more object interaction predictions 165 to make fully-autonomous or semi-autonomous driving decisions. For example, the planning subsystem 136 can generate a fully-autonomous plan to predict the trajectory of a stroller that is being pushed by a pedestrian on the sideway, and navigate around the stroller. As another example, determining that two objects are interacting might cause the planning system 136 to properly identify an object that would otherwise be static as dynamic.

A user interface subsystem 138 can receive the object interaction predictions 165 and can generate a user interface presentation that indicates the locations of nearby objects that are interacting with each other, e.g., a pedestrian and a roller baggage that the pedestrian is pulling. For example, the user interface subsystem 138 can generate a user interface presentation having image or video data containing a representation of the regions of space that are likely to be occupied by a main object and an interacting object. An on-board display device can then display the user interface presentation for passengers of the vehicle 122.

The on-board neural network subsystem 134 can also use the input sensor data 155 to generate training data 123. The on-board system 120 can provide the training data 123 to the training system 110 in offline batches or in an online fashion, e.g., continually whenever it is generated.

The training system 110 is typically hosted within a data center 112, which can be a distributed computing system having hundreds or thousands of computers in one or more locations.

The training system 110 includes a training neural network subsystem 114 that can implement the operations of each layer of a neural network that is designed to make object interaction predictions from input sensor data. The training neural network subsystem 114 includes a plurality of computing devices having software or hardware modules that implement the respective operations of each layer of the neural network according to an architecture of the neural network.

The training neural network generally has the same architecture and parameters as the on-board neural network. However, the training system 110 need not use the same hardware to compute the operations of each layer. In other words, the training system 110 can use CPUs only, highly parallelized hardware, or some combination of these.

The training neural network subsystem 114 can compute the operations of each layer of the neural network using current parameter values 115 stored in a collection of model parameter values 170. Although illustrated as being logically separated, the model parameter values 170 and the software or hardware modules performing the operations may actually be located on the same computing device or on the same memory device.

The training neural network subsystem 114 can receive training examples 123 as input. The training examples 123 can include labeled training data 125. Each of the training examples 123 includes input sensor data as well as one or more labels that indicate the location of one or more main objects and the location of one or more corresponding interacting objects within regions of space represented by the input sensor data.

The training neural network subsystem 114 can generate, for each training example 123, one or more object interaction predictions 135. Each object interaction prediction 135 represents main object information and interacting object information. A training engine 116 analyzes the object interaction predictions 135 and compares the object interaction predictions to the labels in the training examples 123. The training engine 116 then generates updated model parameter values 145 by using an appropriate updating technique, e.g., stochastic gradient descent with backpropagation. The training engine 116 can then update the collection of model parameter values 170 using the updated model parameter values 145.

After training is complete, the training system 110 can provide a final set of model parameter values 171 to the on-board system 120 for use in making fully autonomous or semi-autonomous driving decisions. The training system 110 can provide the final set of model parameter values 171 by a wired or wireless connection to the on-board system 120.

Figure 2:
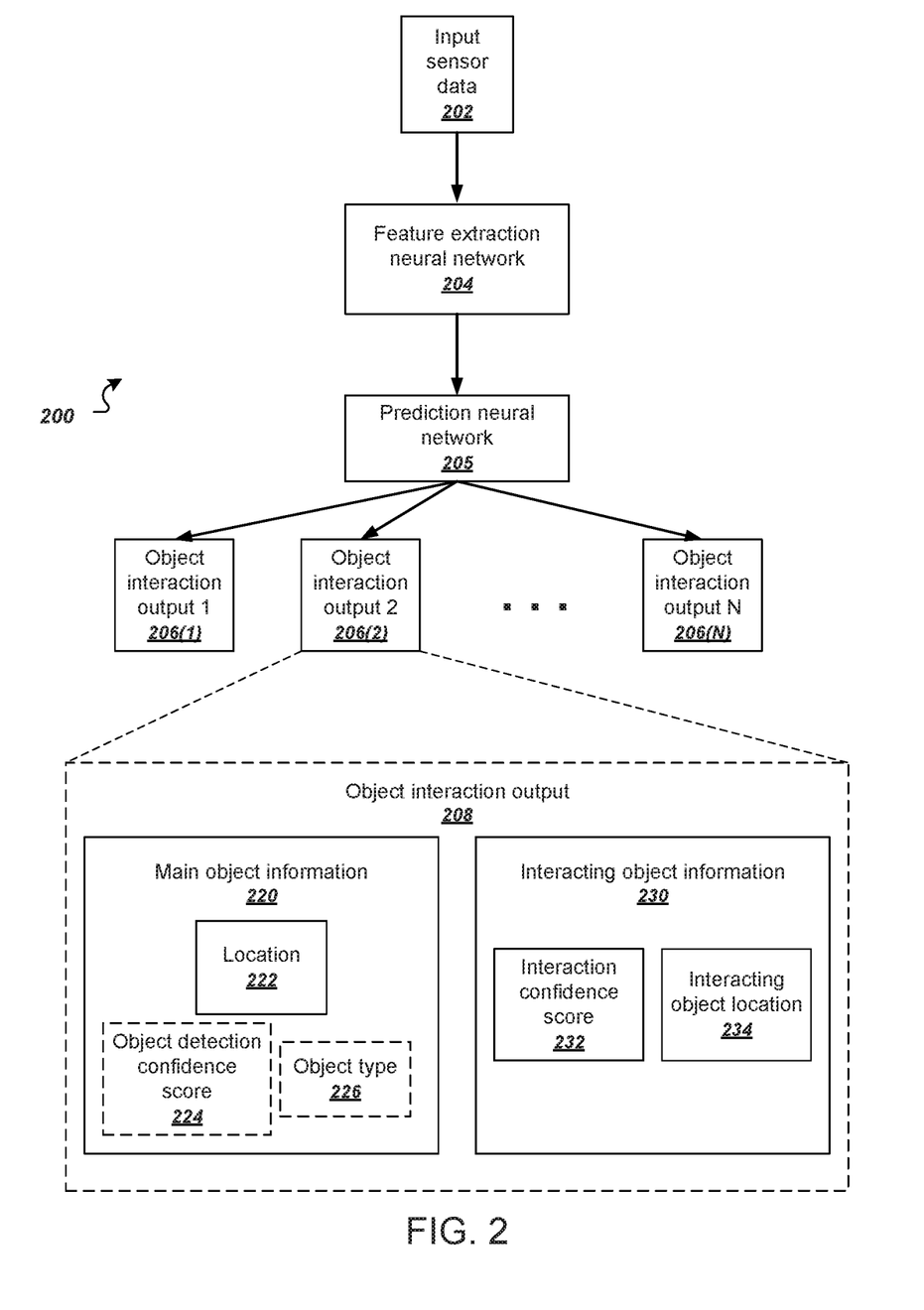
FIG. 2 illustrates an example architecture of an object interaction neural network for making object interaction predictions from input sensor data.

FIG. 2 illustrates an example architecture of an object interaction neural network 200 for making object interaction predictions from input sensor data 202. The input sensor data 202 is derived from data generated by one or more sensors that characterizes a scene. For example, the sensor input can include images, videos, radar data, laser data, or combinations of these data.

The network 200 includes a feature extraction neural network 204 that takes input sensor data 202 as input and generates features extracted from the input sensor data. Generally, in machine learning and pattern recognition, feature extraction starts from an initial set of measured data and builds derived values, i.e., a set of features, intended to be informative about properties of the input sensor data and non-redundant.

Generally, the feature extraction neural network 204 is a convolutional neural network that includes a number of convolutional layers and optionally, a number of deconvolutional layers. Each convolutional layer and deconvolutional layer has parameters whose values define the filters for the layer.

In some implementations, the feature extraction neural network 204 can be a Feature Pyramid Network (FPN) (Lin, Tsung-Yi, et al. "Feature pyramid networks for object detection." Proceedings of the IEEE conference on computer vision and pattern recognition. 2017), which includes a bottom-up pathway, a top-down pathway, and lateral connections.

The bottom-up pathway is the feedforward computation of the convolutional neural network and computes a feature hierarchy consisting of intermediate feature maps of the input sensor data 202 at several scales. For example, for an input image having dimension 512×512, the bottom-up pathway with a scaling step of 2 and number of scales of 3 can generate intermediate feature maps at 3 scales, having dimensions 128×128×32, 64×64×64 and 32×32×128, respectively. The intermediate feature maps at the last scale (32×32×128), are spatially coarser, but semantically stronger. In some implementations, the bottom-up pathway of the feature extraction neural network 204 can use the feature activation output by each stage's last residual block of ResNets (He, Kaiming, et al. "Deep residual learning for image recognition." Proceedings of the IEEE conference on computer vision and pattern recognition. 2016).

The top-down pathway takes the spatially courser, but semantically stronger, intermediate feature maps at the highest scale in the bottom-up pathway as input, and computes high resolution features by upsampling the input features maps at several scales. For example, the top-down pathway with a scaling step of 2 and number of scales of 3 can generate intermediate feature maps at 3 scales, having dimensions 32×32×64, 64×64×32 and 128×128×16, respectively.

These intermediate feature maps from the top-down pathway are then enhanced with the intermediate features from the bottom-up pathway via lateral connections. Each lateral connection merges feature maps of the same spatial size from the bottom-up pathway and the top-down pathway. The bottom-up feature map is of lower-level semantics, but its activations are more accurately localized as it was subsampled fewer times. For example, for the outputs of the bottom-up and top-down pathways discussed in the examples above, the lateral connections stack the intermediate feature maps having the same spatial size from the two pathways together and output the final feature maps at 3 scales, having dimensions 32×32×192, 64×64×96, 128×128×48.

The network 200 also includes a prediction neural network 205 that generates a fixed number of object interaction output 206(1), 206(2), through 206(N), from the input sensor data 202. The prediction neural network 205 takes as input, the feature maps at several scales generated from the feature extraction neural network 204, and predicts object interaction outputs at several scales.

In some implementations, the prediction neural network 205 can include a Region Proposal Network (RPN) (Ren, Shaoqing, et al. "Faster r-cnn: Towards real-time object detection with region proposal networks." Advances in neural information processing systems. 2015). The RPN takes anchors as input, which are fixed-size rectangles defined over the feature maps, and predicts the likelihood that each anchor contains an object and predicts a coordinate offset relative to each anchor that represents the location information of the object detected in each anchor. The likelihood prediction and the location information prediction are output heads of the prediction neural network 205, and can be implemented as one or more convolutional layers and/or fully connected layers.

In addition to the location information head and likelihood information head, the prediction neural network 205 can further include an interaction prediction head which predicts the likelihood that a main object and an interacting object are interacting with each other. By using the RPN and anchors, each object interaction output corresponds to a region in the input sensor data that is likely to be occupied by a main object, which possibly interacts with an interacting object.

There are N sets of heads in the prediction neural network 205 and each set of heads generates one of the outputs 206(1), 206(2), through 206(N).

The object interaction output 208 is an example of one of the outputs 206(1), 206(2), through 206(N). The object interaction output 208 includes main object information 220 and interacting object information 230. The main object information 220 predicts a main object location 222 of a main object in the input sensor data 202. The main object location 222 can be represented as a bounding box around the main object, and the object interaction output defines the bounding box by specifying the coordinates of the center of the box in the input sensor data and the width and height of the bounding boxes.

In some implementations, the main object information 220 further includes an object detection confidence score 224 that represents a likelihood that the main object is depicted at the main object location represented by the bounding box. The object interaction output with main object information that has an object detection confidence score lower than a certain threshold can be discarded because it's not likely that the corresponding bounding box depicts an object.

In some implementations, the main object information further includes an object type output 226 that includes a respective probability for each of a plurality of object classes that represents a likelihood that the main object belongs to the object class.

The interacting object information 230 predicts (i) an interaction confidence score 232 that represents a likelihood that there is another object interacting with the main object and (ii) an interacting object location 234 that predicts the location of the interacting object in the input sensor data 202, if such an object exists. For example, the interacting object location 234 can be represented as a bounding box around the interacting object, and the object interaction output defines the bounding box by specifying the coordinates of the center of the box in the input sensor data and the width and height of the bounding box.

A neural network system, e.g., training neural network subsystem 114 of FIG. 1, can train the network 200 using any appropriate training techniques with a collection of training data. In some implementations, the system uses labeled training data 125 to improve the performance of the network 200.

After being trained, a neural network system, e.g., the on-board neural network subsystem 134 can use the values of parameters of the trained network 200 to make object interaction predictions for use in making autonomous driving decisions or for use in determining which data to present to an operator of the vehicle.

Figure 3:
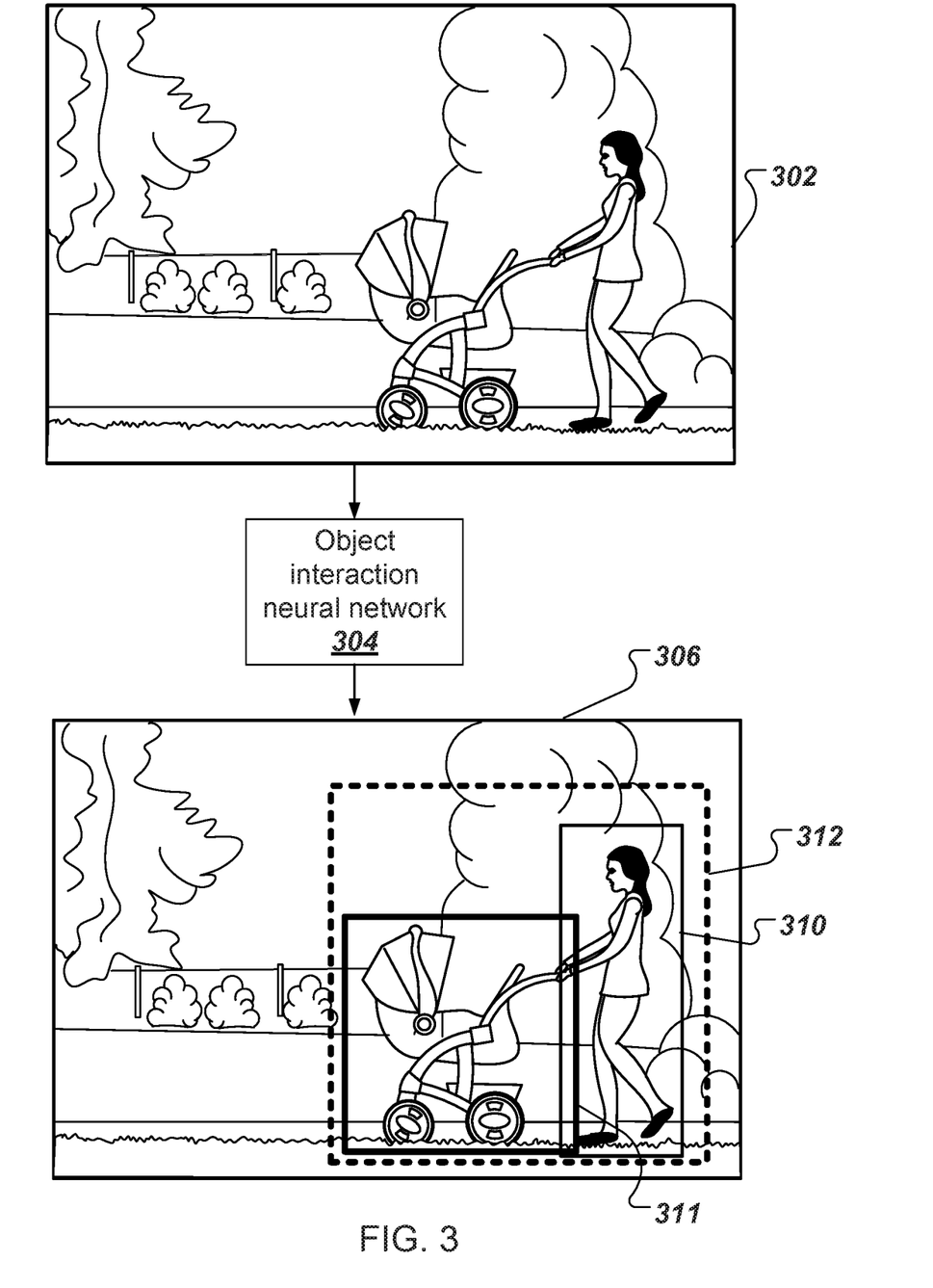
FIG. 3 illustrates an example of detecting an interaction between a main object and an interacting object.

FIG. 3 illustrates an example of detecting an interaction between a main object and an interacting object. The image 302 is a camera image taken from the sensor subsystem 132. From the camera image 302, it can be seen that a woman is interacting with a stroller, e.g., pushing the stroller on the sideway. This can indicate that the stroller is moving together with the woman.

The object interaction neural network 304 can process the camera image 302 and can generate an object interaction output that is illustrated on image 306. The object interaction output can include a main object information that identifies the woman's location in the camera image. In FIG. 3, the main object information is represented by a bounding box 310 in image 306. The object interaction output can include an interacting object information that identifies the stroller's location in the camera image. In FIG. 3, the interacting objection information is represented by a bounding box 311 in the image 306.

Besides interacting object (e.g., the stroller) location, the interacting object information can also include an interaction confidence score that predicts the likelihood that the woman is interacting with the stroller.

When a planning subsystem 136 receives the object interaction prediction that a woman is pushing a stroller, the planning subsystem 136 can use this object interaction prediction to make fully-autonomous or semi-autonomous driving decisions.

For example, the planning subsystem 136 can group the woman and the stroller as one moving object, represented as a box 312 in image 306. Then the planning subsystem 136 can generate a fully-autonomous plan to predict the trajectory of a stroller based on a known trajectory of the woman, and navigate around the stroller.

As another example, determining that two objects are interacting might cause the planning system 136 to properly identify an object that would otherwise be static as dynamic. From the object interaction prediction illustrated in image 306 in FIG. 3, if the interaction confidence score is high, which indicates a high likelihood that the woman is pushing the stroller, the planning system 136 can properly identify that the stroller is moving instead of static.

In some implementations, the object interaction neural network 304 can be trained to identify only objects of a particular object type as the main objects, e.g., only identify pedestrians as main objects, and to identify objects of any other type as interacting objects. This kind of neural network can be called Actor-Centric model. As shown in FIG. 3, by using an Actor-Centric model in 304, the woman can be detected as a main object and the stroller can be detected as an interacting object.

An Actor-Centric model can generate accurate "person" detection. In some implementations, an Actor-Centric model can also generate accurate "interacting object" detection if the object and person have roughly similar scale. With an Actor-Centric model, the detected object boxes can be near extremities of the person.

In some other implementations, the object interaction neural network can be trained to identify only objects of a particular object type as the interacting objects, e.g., to only identify pedestrians as interacting objects, and to identify objects of any type as the main objects. This kind of neural network can be called Object-Centric model. As shown in FIG. 3, by using an Object-Centric model in 304, the stroller can be detected as a main object and the woman can be detected as an interacting object.

In some input sensor data, it can be easier to detect person given an object than to detect an object given a person. For example, human may have large scale, thus can be easier to detect than small objects. As another example, human may have known shape, thus can be easier to detect than "arbitrary" objects. Therefore, by using an Object-Centric model, it can be easier to localize human with known shape as the interacting object, while detecting arbitrary object as the main object. For example, larger scale of human can make detection easier as the features for human are likely to be present in the fine-grained feature maps.

Additionally, an Object-Centric model can represent multiple interactions for the same person and each interaction comes from a separate object. For example, an Object-Centric model may generate two object interaction outputs: (1) a coffee mug as a main object and a man holding the coffee mug as an interacting object; (2) a phone as a main object and the same man as in (1) holding the phone as an interacting object. In this example, an Object-Centric model can represent two interactions for the same man and the two interactions comes from a coffee mug and a phone separately.

Figure 4:
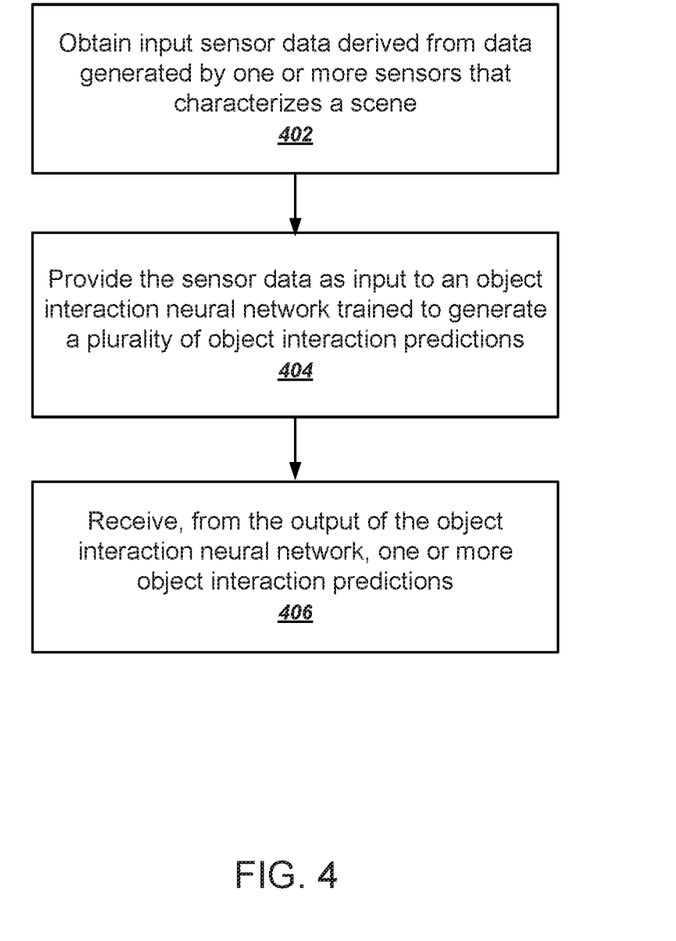
FIG. 4 is a flow chart of an example process for computing an object interaction prediction from input sensor data.

FIG. 4 is a flow chart of an example process for computing an object interaction prediction from input sensor data. The example process in FIG. 4 uses a forward inference pass through a neural network that has already been trained or is being trained to make object interaction predictions. The example process can thus be used during training or to make predictions from unlabeled input, e.g., in a production system. The process will be described as being performed by an appropriately programmed neural network system.

The system obtains input sensor data derived from data generated by one or more sensors that characterizes a scene (402). In general, the input sensor data can be one or multiple channels of data from one sensor, e.g., just an image, or multiple channels of data from multiple sensors, e.g., an image generated from the camera system and laser data generated from the laser readings.

If the process is being performed by an on-board system, e.g., the on-board system 120 of FIG. 1, the on-board system can receive the raw sensor data and generate the corresponding input sensor data. If the process is being performed during training, typically the input sensor data will already have been generated from the raw sensor data by an on-board system or another system.

The system provides the input sensor data as input to an object interaction neural network to generate a plurality of object interaction predictions (404). The architecture of an example neural network that is suitable for making object interaction predictions from input sensor data is described in more detail above with reference to FIG. 2.

The system receives, as output from the object interaction neural network, one or more object interaction predictions (406). As described above, each object interaction prediction specifies main object information and interacting object information. The interacting object information includes an interaction confidence score that represents a likelihood that there is another object interacting with the main object in the input sensor data.

After generating the object interaction predictions, the system can take different actions depending on whether the forward inference pass is being used for training or in a production system. During training, the object interaction predictions can be used to compute one or more errors based on the labels in the training example used. The errors can be used to compute updated weights for the neural network, which can be computed and updated using any appropriate training technique, e.g., gradient descent with backpropagation.

When used in an on-board production system, the object interaction predictions can be provided to a planning subsystem that makes decisions about how the vehicle should react to the predicted interacting objects. For example, these interaction predictions can be exploited at many stages of a self-driving car pipeline, e.g., segmentation, tracking, action recognition and behavior prediction.

In some implementations, the system can add a second stage that predicts an additional refinement on the interacting object location.

In the second stage, feature maps extracted from the feature extraction neural network 204, i.e., features maps that are the outputs of one or more of the intermediate layers of the feature extraction neural network, can be processed based on the interacting object location from initial prediction in the first stage.

For example, parts of the feature maps can be cropped based on the bounding box prediction for the interacting object, i.e., the portion of a given feature map that corresponds to the location of the bounding box for the interacting object can be cropped. In an FPN implementation of the feature extraction neural network, each feature map at a plurality of multiple scales can be cropped at the corresponding scale.

The cropped feature map can represent features at one or multiple scales that all correspond to the same initial interacting object location prediction. The system can process these cropped feature maps using a refinement neural network to predict a refined bounding box for the interacting object. This refinement neural network can be implemented as one or more convolutional layers and/or fully connected layers.

Adding this second stage to the object interaction neural network may generate more accurate interacting object location information, e.g., more accurate bounding box prediction.

In some implementations, the system can also process the input sensor data using another object detection model and use the outputs of this other object detection model to refine the location predictions for the interacting objects. The other object detection model can predict locations of one or more types of objects in the input sensor data and can be, e.g., a neural network model.

For example, for any given interacting prediction predicted by the object interaction neural network, if the other object detection model does not detect that there is an object at the location of the interacting object, the system can discard the interacting object prediction. As another example, the system can compare the distance between the predicted interacting object and each detected object from the other object detection model. If the closest object detected by the other object detection model is sufficiently close to the location of the interacting object as predicted by the object interaction neural network, the system can shift the location of the interacting object to match the location of the closest object as detected by the other object detection model.

In some implementations, the Actor-Centric model and Object-Centric model can be combined. In particular, the system can utilize the Actor-Centric model and the Object-Centric model, i.e., process the same input sensor data using both models, and combine the output of these two models. For example, if the main object detected by the Actor-Centric model is sufficiently close to the interacting object detected by the Object-Centric model and the corresponding interacting object detected by the Actor-Centric model is sufficiently close to the corresponding main object detected by the Object-Centric model, the system can determine that the two models have detected the same pair of interacting objects. The system can generate a combined interaction confidence score as an average of the two interaction confidence scores from both models for the pair of interacting objects. This combined interaction confidence score can more accurately represent the likelihood that the two objects are interacting with each other.

Figure 5:
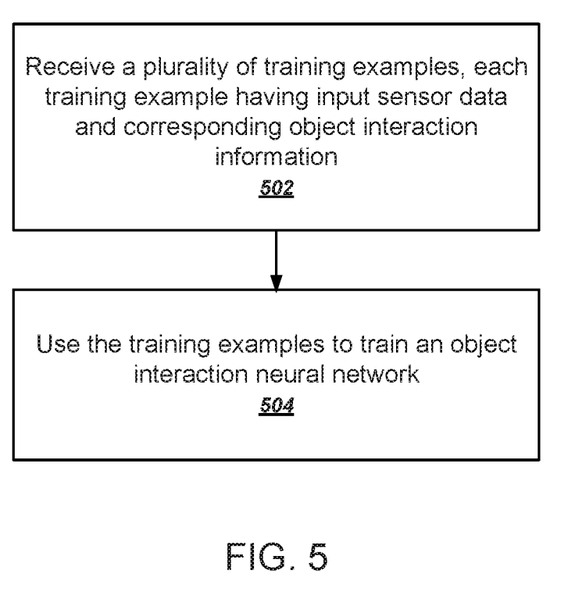
FIG. 5 is a flow chart of an example process for training an object interaction neural network.

FIG. 5 is a flow chart of an example process for training an object interaction neural network. The process will be described as being performed by an appropriately programmed neural network system, e.g., the training system 100 of FIG. 1.

The system receives a plurality of training examples, each training example having input sensor data and corresponding object interaction information (502). As discussed above, the input sensor data can be generated from the raw sensor data by an on-board system or another system. The object interaction information can be one or more labels that indicate the location of one or more main objects and, for each main object, whether the main object is interacting with one or more other objects and, if so, the location of the one or more corresponding interacting objects within regions of space represented by the input sensor data.

The system uses the training examples to train an object interaction neural network (504). The system can generate, for each input sensor data in the training examples, one or more object interaction predictions. Each object interaction prediction represents predicted main object information and predicted interacting object information.

The system can compare the object interaction predictions to the labels in the training examples. The system can calculate a loss which can measure the difference between the object interaction prediction and the labels in the training examples. The loss can include: (1) object detection loss, e.g., a weighted Huber loss and; (2) classification loss, e.g., sigmoid focal loss (Lin, Tsung-Yi, et al. "Focal loss for dense object detection." Proceedings of the IEEE international conference on computer vision. 2017).

The object detection loss can measure the difference between the predicted location of an object and the location of the object in the label. The object detection loss can measure location differences for both the main objects and interacting objects. The classification loss can measure the difference between the predicted interaction confidence score and the interaction label, i.e., whether the main object is interacting with one or more other objects. In some implementations, the main object information further includes an object type output that includes a respective probability for each of a plurality of object classes that represents a likelihood that the main object belongs to the object class. In these implementations, the classification loss can measure the differences between object type probability for each object class and the class label.

The system can then generate updated model parameter values based on the loss by using an appropriate updating technique, e.g., stochastic gradient descent with backpropagation. The system can then update the collection of model parameter values using the updated model parameter values.

In implementations where the calculation of the interaction confidence score and the calculation of the interacting object location are implemented as independent convolutional layers in the prediction neural network, the training of the object interaction neural network can be modified to account for this independence.

For example, if the object interaction neural network has been trained to only identify pedestrians as main objects, and to identify objects of any type as interacting objects, the interaction confidence score prediction and interacting object location prediction are only meaningful when the detected main object is a person. So, during training, when the detected main object is not a person, the loss for the interaction confidence score prediction and interacting object location prediction, i.e., the outputs of the convolutional layers that generate these predictions, is not accumulated.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    obtaining a sensor input derived from data generated by one or more sensors that characterizes a scene;
    providing the sensor input as input to an object interaction neural network, wherein the object interaction neural network is configured to:
        process the sensor input to generate a plurality of object interaction outputs, each respective object interaction output comprising:
            main object information that identifies a main object location of a main object in the sensor input;
            interacting object information that identifies (i) an interaction confidence score that represents a likelihood that there is another object interacting with the main object and (ii) data defining the location of the interacting object in the sensor input, when such an object exists; and
    receiving, as output of the object interaction neural network, the respective object interaction outputs corresponding to a plurality of regions in the sensor input.

2. The method of claim 1, wherein the sensor input comprises an image of the scene.

3. The method of claim 2, wherein the input to the object interaction neural network further comprises a depth input that characterizes a depth of the scene at different locations in the sensor input.

4. The method of claim 2, wherein the sensor input comprises point cloud data characterizing the scene.

5. The method of claim 1, wherein the main object information further comprises:
    an object detection confidence score that represents a likelihood that the main object is depicted at the main object location.

6. The method of claim 1, wherein the main object information further comprises:
    an object type output that includes a respective probability for each of a plurality of object classes that represents a likelihood that the main object belongs to the object class.

7. The method of claim 1, further comprising:
    identifying a first object interaction output that includes an interaction confidence score that exceeds a threshold value;
    obtaining features of a region in the sensor data that includes the interacting object location of the interacting object in the first object interaction output;
    providing the features as input to a refinement neural network that is configured to process the features to generate a refined location of the interacting object in the sensor input; and
    obtaining, as output from the refinement neural network, the refined location of the interacting object.

8. The method of claim 1, further comprising:
    obtaining a location output of an object detector that detects objects of a particular type in the sensor input;
    determining whether any of the interacting object locations in the object interaction outputs match locations of objects of the particular type as defined by the location output; and
    when the interacting object location of an interacting object matches a location of an object of the particular type, determining that the interacting object is the same object as the object of the particular type.

9. The method of claim 1, wherein the object interaction neural network has been trained to identify only objects of a particular object type as the interacting objects.

10. The method of claim 9, wherein the particular object type is people.

11. The method of claim 1, wherein the object interaction neural network has been trained to identify people as the main objects in the object interaction outputs.

12. A system comprising:
    one or more computers and one or more storage devices storing instructions that are operable, when executed by the one or more computers, to cause the one or more computers to perform operations comprising:

obtaining a sensor input derived from data generated by one or more sensors that characterizes a scene;

providing the sensor input as input to an object interaction neural network, wherein the object interaction neural network is configured to:

process the sensor input to generate a plurality of object interaction outputs, each respective object interaction output comprising:

main object information that identifies a main object location of a main object in the sensor input;

interacting object information that identifies (i) an interaction confidence score that represents a likelihood that there is another object interacting with the main object and (ii) data defining the location of the interacting object in the sensor input, when such an object exists; and receiving, as output of the object interaction neural network, the respective object interaction outputs corresponding to a plurality of regions in the sensor input.

13. The system of claim 12, wherein the sensor input comprises an image of the scene.

14. The system of claim 13, wherein the input to the object interaction neural network further comprises a depth input that characterizes a depth of the scene at different locations in the sensor input.

15. The system of claim 13, wherein the sensor input comprises point cloud data characterizing the scene.

16. The system of claim 12, wherein the main object information further comprises:

an object detection confidence score that represents a likelihood that the main object is depicted at the main object location.

17. The system of claim 12, wherein the main object information further comprises:

an object type output that includes a respective probability for each of a plurality of object classes that represents a likelihood that the main object belongs to the object class.

18. The system of claim 12, wherein the operations further comprise:

identifying a first object interaction output that includes an interaction confidence score that exceeds a threshold value;

obtaining features of a region in the sensor data that includes the interacting object location of the interacting object in the first object interaction output;

providing the features as input to a refinement neural network that is configured to process the features to generate a refined location of the interacting object in the sensor input; and obtaining, as output from the refinement neural network, the refined location of the interacting object.

19. The system of claim 12, wherein the operations further comprise:

obtaining a location output of an object detector that detects objects of a particular type in the sensor input;

determining whether any of the interacting object locations in the object interaction outputs match locations of objects of the particular type as defined by the location output; and when the interacting object location of an interacting object matches a location of an object of the particular type, determining that the interacting object is the same object as the object of the particular type.

20. A computer program product, encoded on one or more non-transitory computer storage media, comprising instructions that when executed by one or more computers cause the one or more computers to perform operations comprising:

obtaining a sensor input derived from data generated by one or more sensors that characterizes a scene;

providing the sensor input as input to an object interaction neural network, wherein the object interaction neural network is configured to:

process the sensor input to generate a plurality of object interaction outputs, each respective object interaction output comprising:

main object information that identifies a main object location of a main object in the sensor input;

interacting object information that identifies (i) an interaction confidence score that represents a likelihood that there is another object interacting with the main object and (ii) data defining the location of the interacting object in the sensor input, when such an object exists; and receiving, as output of the object interaction neural network, the respective object interaction outputs corresponding to a plurality of regions in the sensor input.

* * * * *